United States Patent [19]

Hutchins, Jr.

[11] 3,855,515
[45] Dec. 17, 1974

[54] MOTOR CONTROL CIRCUIT

[75] Inventor: Burleigh M. Hutchins, Jr., Mansfield, Mass.

[73] Assignee: Waters Associates, Inc., Framingham, Mass.

[22] Filed: Mar. 6, 1972

[21] Appl. No.: 232,076

[52] U.S. Cl.................... 318/685, 318/696, 417/38, 417/44, 318/432
[51] Int. Cl. .......................................... H02k 37/00
[58] Field of Search .......... 318/138, 254, 696, 685, 318/432, 434, 645; 417/38, 44

[56] References Cited
UNITED STATES PATENTS

| | | | |
|---|---|---|---|
| 2,722,198 | 11/1955 | MacGeorge | 318/645 X |
| 3,015,768 | 1/1962 | Hornfech et al. | 318/645 |
| 3,117,268 | 1/1964 | Madsen | 318/696 |
| 3,424,961 | 1/1969 | Leenhouts | 318/696 |
| 3,452,263 | 6/1969 | Newell | 318/696 |
| 3,465,276 | 9/1969 | Silva et al. | 318/621 |
| 3,530,347 | 9/1970 | Newell | 318/696 |
| 3,553,549 | 1/1971 | Leenhouts | 318/696 |
| 3,577,176 | 5/1971 | Kreithen | 318/432 |

OTHER PUBLICATIONS

Electro Sales Inc. Catalog SS1265-2; March 1967, pg. 7.

*Primary Examiner*—R. Simmons
*Attorney, Agent, or Firm*—Robert A. Cesari; John F. McKenna; Andrew F. Kehoe

[57] ABSTRACT

A motor control circuit limits power dissipation in a stepping motor by limiting the motor driving current to that required by the load. Resonance effects in the driving motor are substantially eliminated by eliminating undesired reverse driving current. A variable frequency pulse generator establishes the motor driving rate. And a simple but efficient power supply provides the required voltages for the control circuit.

22 Claims, 5 Drawing Figures

MOTOR CONTROL CIRCUIT

BACKGROUND OF THE INVENTION

A. Field of the Invention

The invention relates to control circuits and, more particularly, to motor control circuits. It also relates to power supplies.

B. Prior Art

A stepping motor utilizes two or more driving coils to rotate a rotor in descrete steps in accordance with current pulses supplied to the coils. When the driving current applied to the coils exceeds that required to drive the load connected to the motor, the motor consumes more power than necessary to drive the load and thereby generates more heat than is necessary. In addition to its adverse effects on the motor itself, excessive heat generation may have other adverse consequences. For example, in chromatographic applications, the motor is utilized to drive fluid through a chromatography column. The heat generated by the motor, which is necessarily an integral part of the chromatographic apparatus and which is typically placed near the chromatography column, may adversely affect the measurements being made.

In driving stepping motors, especially those of the bifilar type, "resonance" effects, that is, undesired oscillations, have frequently been observed. Various solutions to eliminate these have been proposed, but the solutions have frequently been only partly effective and often are complex and costly.

SUMMARY OF THE INVENTION

A. Objects

Accordingly, it is an object of the invention to provide an improved motor control circuit.

Further, it is an object of the invention to provide a motor control circuit which limits power dissipation in a stepping motor in accordance with load requirements.

Another object of the invention is to provide simple yet effective means for limiting oscillation in a stepping motor.

A further object of the invention is to provide an improved variable frequency oscillator.

Still another object of the invention is to provide an improved power supply.

B. Brief Description

In the present invention, a motor control circuit limits the driving current supplied to the coils of a stepping motor in accordance with the load requirements imposed on the motor. The motor drive current is monitored and compared with a measured or programmed load demand in order to determine the level of current to be supplied to the motor. In the specific embodiment of the invention described herein, the motor drives a pump in a fluid system including a chromatography column. The pressure in the hydraulic lines is monitored and used to generate a reference signal to thereby vary the current supplied to the motor in accordance with the line pressure. As the pressure increases, the motor drive current is increased in order to keep up with the demands of the load. Additionally, the driving frequency is increased in accordance with the line measure to compensate for compressibility in the fluid and in the line and thus maintain a constant volume flow rate.

A bifilar-wound stepping motor with a permanent magnet rotor is used as the driving motor in the present invention. As noted previously, stepping motors, particularly those of the bifilar type, tend to oscillate when discreetly driven. Heretofore, it was assumed that this oscillation was primarily, if not solely, the result of inertial effects. However, I have found that a major contribution to this oscillation arises from a reverse voltage induced in a driving coil when current in another driving coil is cut off. This reverse voltage generates a reverse driving current and this current drives the stepping motor in the reverse direction. Thus, after the motor has been driven in the forward direction, it is effectively immediately, and unintentionally, driven in the reverse direction and this causes the undesirable oscillation heretofore wrongly attributed to inertial effects.

The reverse voltage arises from inductive coupling in the motor windings, that is, the transient voltage accompanying turnoff of current in one winding is magnetically coupled to the other winding to thereby induce a voltage in the latter. The polarity of the windings is such that the induced voltage is the reverse of that normally applied to drive the motor. Typically, the windings are each connected in series with a switch which is used to control the application of current to the windings. Commonly, the switch is a transistor and the winding is connected in series with the collector-emitter path of ghis transistor, the control signal being applied to the base electrode to turn the transistor on or off. When a reverse voltage is applied to a driving winding, therefore, the base-collector circuit effectively becomes a forward-biased diode which conducts current heavily in the reverse direction, that is, from base to collector. The current flowing in the coil thus tends to step the motor in the reverse direction and this gives rise to the familiar oscillation.

Having thus recognized the problem, I solve it simply and inexpensively by inserting a diode in series with the motor coil and oriented such that is passes current in a forward direction only, that is, from collector to emitter when the base is forward biased, and passes essentially no cureent in the reverse direction, that is, from base to collector. Accordingly, when current is turned off in one winding, the voltage induced in another winding magnetically coupled to it cannot cause current to flow in that winding.

Control pulses for the stepping motor are provided by a pulse generator whose pulse repetition frequency can be varied as desired. The generator is formed from a variable frequency oscillator which drives a bank of flip-flops providing control pulses in fixed relation to each other. In the preferred embodiment of the invention discussed hereinafter, a stepping motor having four separate control windings in bifilar pairs is used, and these windings are pulsed in accordance with the outputs of a four-phase flip-flop which is also known as a "Johnson" counter or "Johnson" flip-flop. This unit provides control pulses on four distinct output leads, each pulse having a duration of approximately one half of the period of the counter, and being out of phase with the other pulses by a multiple of 90°.

The oscillator which drives the flip-flop is formed from an integrator having a programable switch connected across the integrating capacitor. Preferably the switch is formed from a unijunction transistor whose gate is connected to a potential source to set the switching point and to thus control the period of the oscillator. In the embodiment described herein, the potential applied to this gate is varied in accordance with the pressure of fluid in a fluid line in order to correct for compressibility of either the fluid or the line itself. This effectively varies the oscillator frequency in accordance with the line pressure so as to speed up the oscillator, and thus the motor, when the pressure is high, and to slow the oscillator and motor when the pressure is low, to thereby maintain a substantially constant volume flow rate.

The input to the integrator comprises a driving current whose magnitude is selected by the operator in accordance with the volume flow rate desired. Means are provided to cut off the input to the integrator when the measured pressure in the line exceeds a predetermined set point.

A pair of simple yet efficient power supplies are provided to provide the necessary supply voltages for the active elements in the control circuit. Both power supplies utilize a series pass regulating element to control the output voltage provided by the supply. In one section of the supply, resistors are bridged across the output terminals of the supply and one of the intermediate nodes in the resistor network is connected to virtual ground by means of an active amplifier having unity voltage feedback. This sets the output terminals at positive and negative potentials, respectively, and provides and effective low impedance ground to which the potentials on the output terminals are referred. Since this ground return is at a low impedance level, changing current demands on the power supply will vary the output voltage only slightly and thus the regulation of the supply is preserved.

DETAILED DESCRIPTION OF THE INVENTION

The foregoing and other and further features and objects of the present invention will be more readily understood on reference to the following detailed description of the invention when taken in conjunction with the accompanying drawings in which.

Figure 1:
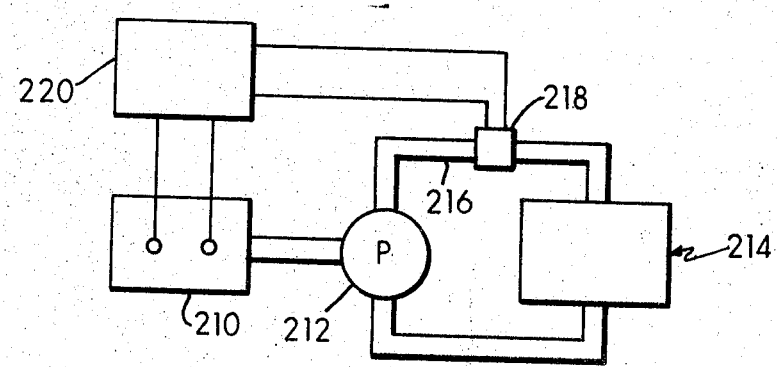
FIG. 1 is a highly schematized block and line diagram of apparatus of the present invention used in connection with a fluid flow system.

In FIG. 1, a motor 210 drives a pump 212 which supplies fluid under pressure to a utilization device 214 by way of a fluid line 216 having a pressure transducer 218 in it. The transducer 218 supplies electrical signals indicative of the pressure in line 216 to a control unit 220 connected to motor 210. The unit 220 controls the driving current applied to the motor 210. The motor 210 is preferably a stepping motor, that is, it has a number of distinct driving coils which can be separately energized to drive a rotor through steps of discrete angular increment. It is desired that the driving current applied to this motor be only such as to drive the load to which the motor is connected and that excessive driving current, which results in increased heat dissipation, not be applied to the motor. The control unit 20 performs this function, among others.

Figure 2:
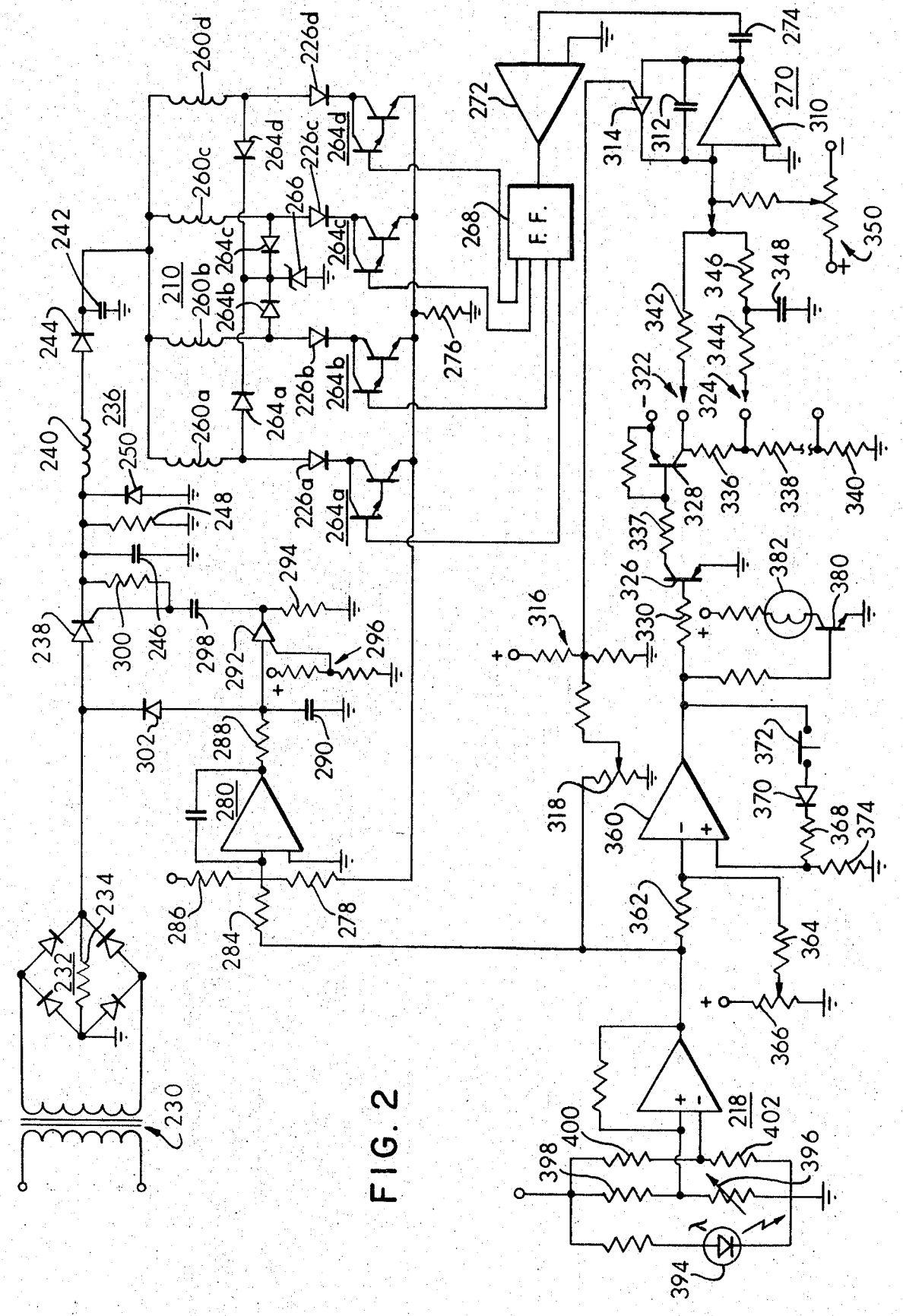
FIG. 2 is a schematic diagram of a preferred form of control circuit in accordance with the present invention.

Turning now to FIG. 2, the control circuit on the present invention is shown in detail. In FIG. 2, a transformer 230 has a primary winding connected to an AC power source and a secondary winding connected across a full-wave diode bridge rectifier 232. The bridge 232 has a resistor 234 connected from its output terminal to ground for reasons to be described hereinafter. The output of the bridge 232 is applied to a filter 236 through a controllable switching element preferably in the form of a silicon controlled rectifier 238. The filter 236 is formed from an inductor 240, capacitor 242, and diode 244. A capacitor 246, resistor 248, and diode 250 are interposed between the filter 236 and rectifier 238 for reasons described hereafter.

Figure 3:
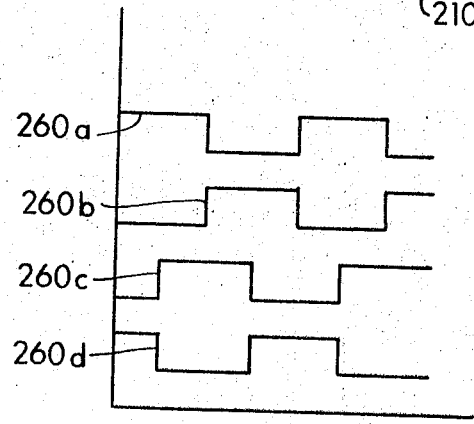
FIG. 3 is a sketch of driving wave forms for the circuit of FIG. 2.

The output of filter 236 is applied to control windings 260a-260d of motor 210. The motor 210 is a stepping motor having a permanent magnet rotor and pairs of bifilar-windings, that is coils 260a and 260b are bifilar wound as are coils 260c and 260d. Motors of this type are sold under the mark Slo-Syn by the Superior Electric Company. The motor windings are connected in series with diodes 262a–262d as well as with the collector-emitter of transistor pairs 264a–262d connected in a Darlington configuration. Diodes 264a–264d are connected from one of the inductors 260a–260d, respectively, to ground through a Zener diode 266. The conduction state of the transistor pairs 264a–264d is controlled by the outputs of a flip-flop 268. The flip-flop 268 is a 4-phase flip-flop commonly known as a "Johnson" flip-flop or a "Johnson" counter which provides output pulses on four discrete leads, each pulse having a duration of approximately 180°. The pulses are of positive polarity such that, when applied to the base of the respective transistor pairs 262a–262d, they cause these transistors to conduct so that current is drawn down through the corresponding motor winding to step the motor to a new angular position. The control outputs of flip-flop 268, and thus the driving currents in windings 260a–260d, are shown in FIG. 3. Flip-flop 268 is driven from an oscillator 270 through an amplifier 272 and a capacitor 274. Oscillator 270 will be described in detail hereafter.

The current being drawn through the motor 210 at any given time is sensed by means of a resistor 276 and a voltage proportional to this current is applied through a resistor 278 to the summing junction of an integrator 280. A second input is applied to the integrator from a pressure transducer 218 through a resistor 284. A negative bias current is also supplied to integrator 280 through a resistor 286. The common node to which resistors 278, 284 and 286 are connected comprises a summing junction and the output of integrator 280 is the time sum of the net current injected into this node. This output is applied through a resistor 288 to a capacitor 290. The charge on the capacitor 290 is discharged through a unijunction transistor 292 into a resistor 294. The firing point of the unijunction transistor 292 is determined by means of a voltage applied to its gate through a voltage divider network 296.

When sufficient charge has been accumulated on capacitor 290 to cause transistor 292 to conduct, a voltage is generated across resistor 294 which is coupled through a capacitor 298 to the gate of the silicon controlled rectifier 238 to turn the rectifier "on" and thus connect the output of bridge 232 to filter 236. A resistor 300 connected between gate and cathode of rectifier 238 helps to insure turn-off of the rectifier.

The integrator 280 compares the current called for by both the pressure sensor 218 and the fixed bias source connected to resistor 286 with the current actually supplied to the motor 210. As long as the motor current is less than that called for, the integrator 280 supplies an output which charges capacitor 290 with its upper electrode positive with respect to ground. The rate at which capacitor 290 is charged depends on the net current applied to the integrator input; the larger this current, the greater is the rate at which capacitor 290 is charged, the earlier the point at which the unijunction transistor 296 is triggered, and thus the earlier the rectifier 238 is fired. As the firing point of rectifier 238 advances in each half wave, it delivers more power to the filter 236 and thus to the motor 210.

In order to insure fine control of power supplied to the motor 210, the charge on capacitor 290 is dumped during each half cycle of the full wave rectified output from the bridge rectifier 232. This is accomplished by means of a diode 300 which is connected to the bridge output. Each time the bridge output drops below the voltage on capacitor 290, the capacitor discharges to ground through diode 300 and resistor 234.

As the power demands of the load increase, the point at which the rectifier 238 fires shifts to a point earlier and earlier in each half-wave cycle. When the firing point lies between 90° and 180° in the half-wave cycle, the voltage at the filter output will generally be less than that applied to the anode of the controlled rectifier and the rectifier will fire normally to maintain the required filter output voltage. If more power is demanded, the firing point is advanced toward 90° and the anode voltage is made even larger than the output voltage at firing time. When, however, the firing point is advanced beyond 90° toward 0°, the anode voltage at firing time drops and may become less than the filter output voltage. Normally, this would cause the rectifier to misfire, the output voltage would drop, and the control would advance the firing point to an even earlier position so that the rectifier would quickly block. This is avoided in the present circuit by the provision of capacitor 246 and resistor 248. Capacitor 246 provides a low-impedance path to ground for initial rectifier turn-on, whole resistor 248 provides a DC current path through which a "trickle" current (current of small magnitude) can flow should the rectifier be fired prematurely (that is, when the filter output voltage is greater than the rectifier anode voltage). This current is maintained until the anode voltage rises above the output voltage during the 0°–90° portion of the power cycle.

The inductor 236, in connection with capacitor 242, filters the wave-form passed by rectifier 238 and provides a nearly smooth DC voltage for motor 210. It does this by limiting the current surges associated with turn-on and turn-off storing energy during the transient changes and then delivering it over subsequent and longer time intervals to thereby smooth any peak surges and limit ohmic losses in the motor and elsewhere. When the current flow from rectifier 238 is cut off at the end of each half cycle, the inductor 240 generates a reverse voltage which tends to maintain current flow in the inductor for a brief interval. This current would naturally be drawn through rectifier 238 and thus this rectifier would tend to remain "on." To prevent this, a diode 250 is connected from ground to the inductor and provides a path through which the transient current for inductor 240 may be drawn, thus allowing rectifier 238 to turn off.

Limiting the current applied to the motor in the manner described limits the ohmic losses in the motor and its associated circuitry and thus significantly lowers the power dissipation and heat level of the motor and its controller. This prolongs motor life, lowers ambient temperature, and simplifies circuit design problems by minimizing the temperature range over which the control circuit is required to operate. Additionally, however, it extends the speed range over which the motor achieves a given torque level. The reason for this is that the motor is inductive at high speeds and must be fed from a higher potential source (e.g., 15 volts), but is resistive at low speeds being then fed from a lower potential source (e.g., 2 volts). A series resistor is usually inserted in the current supply leads to limit the current at low speeds; unfortunately, this also limits the current that can be drawn at high speeds and thus the output torque diminishes at higher speeds. This is obviated by the control circuit of the present invention which sets the current drawn at all times to that required to drive the load.

As was previously noted, the windings 260a and 260b, as well as the windings 260c and 260d, are bifilar wound and thus magnetically coupled to each other. I have found that it is this coupling which in fact largely causes the oscillations or "resonance" effects noted in stepping motors of this type. Considering the current in each winding to be in the positive or forward direction when it flows downward in the windings in FIG. 2 and in the negative or reverse direction when it flows upward in these windings, the motor 210 is designed to operate properly when positive current flows in the windings in accordance with the schedule shown in FIG. 2A. However, due to inductive coupling between the windings, a large negative voltage is coupled to winding 260b when current in winding 260a turns off, and vice versa. The same is true of windings 260c and 260d. This voltage greatly exceeds the forward driving voltage from the power supply and it forward-biases the base-collector path of the transistor switch with which it is associated. Thus, it causes a current in the reverse direction through the transistor and through the winding. It is this current which causes the undesired motor oscillations, since it momentarily drives the motor in the reverse direction. If the switch used to control the current in each winding were in fact a perfect switch having infinite impedance, no reverse current could flow, despite the reverse voltage and the motor would not oscillate. However, practical switches are always less than ideal and thus may conduct substantial reverse current.

Having thus recognized the problem, its harmful effects are mitigated simply by placing a diode in series with each motor winding and oriented such as to pass current through the winding when the associated transistor switch is turned "on" in response to a control input and to block current from passage through the winding when the transistor is "off." This is the function of diodes 262a–262d in series with the windings 260a–260d respectively. In the forward direction these diodes present a very low impedance to current flow; in the reverse direction, however, they present an extremely high impedance to current flow and thus effectively protect the motor against reverse current flow caused by voltages coupled in from other windings.

Returning now to oscillator 270, the oscillator 13 formed from an amplifier 310, a capacitor 312, and a unijunction transistor 314. The transistor 314 has a control potential applied to it from a voltage divider 316 as well as from a potentiometer 318 which is connected between the output of pressure transducers 218 and ground. The oscillator 270 receives an input from a switching network 320 through first and second independently actuable switches 322 and 324, respectively. The network 320 comprises transistors 326 and 328 and resistors 330, 322 and 334. A source of negative potential is applied to the emitter of transistor 328 and is coupled to a number of series-connected resistors 336, 338, 340, etc. in the collector circuit of transistor 328 when this transistor is turned "on." The resistor string 336–340 has intermediate terminals or "taps" at which selected fractions of the voltage applied at the emitter of 328 may be obtained. The voltages at the taps selected by switches 320 and 324 are coupled to the oscillator 270 through a resistor 342 in the case of switch 322 and through resistors 344 and 346 and capacitor 348 in the case of switch 324.

The magnitude of resistor 342 is such that as switch 322 moves from one tap to another on switching network 320, the current supplied through resistor 342 to oscillator 270 changes by one unit. Similarly, the magnitude of the resistors 344 and 346 is such that as switch 324 moves from tap to tap along the switching network 320, the magnitude of the current supplied through these resistors to oscillator 270 changes by 10 units. The capacitor 348 slows the rate at which the current to oscillator 270 is allowed to change when the switch 324 moves from tap to tap. A biasing current of selectable polarity is also applied to oscillator 270 from a network 350.

Oscillator 270 comprises a very simple yet effective sawtooth wave generator. The amplifier 310 and capacitor 312 form an integrator which provides an output voltage proportional to the magnitude and polarity of the current supplied to its input. The time constant of the integrator, which is determined by the capacitor 312 and by the magnitudes of the impedences connected to its input, is such that the output voltage rises essentially linearly during the time over which the integrator is to integrate. When the output voltage reaches a magnitude equal to that applied to the gate of unijunction transistor 314, this transistor "fires," thus discharging the capacitor 312 through it. After firing, the transistor 314 turns "off" and capacitor 312 again starts charging. Thus a repetitive ramp wave form is generated. The duration of the ramp is determined by the magnitude of the signal applied to the input of oscillator 270, as well as by the magnitude of the gate control signal on transistor 314. By decreasing the latter, or increasing the former, the repetition frequency of the oscillator for 270 is increased. Conversely, it is decreased by increasing the magnitude of the gating signal applied to the transistor 314 or by decreasing the driving input applied through the switches 342 and 344.

The operation of switching network 320 is controlled from an amplifier 360 which has an input connected through a resistor 362 to the output of pressure sensor 218 and through a resistor 364 to the wiper arm on a potentiometer 366 to which a positive biasing potential is applied. A resistor 368, a diode 370 and a pushbutton switch 372 are connected between one input of the amplifier 360 and its output, and a resistor 374 is connected between this input and ground.

The amplifier 360 compares the output of pressure sensor 218, which is proportional to the pressure in the fluid line driven by motor 210, with a preestablished "set point" determined by the setting of potentiometer 366. As long as the pressure corresponding to the output of the sensor 218 is less than that corresponding to the set point, the output of amplifier 360 is negative. This holds the transistors 326 and 328 "on," and a portion of the negative potential applied to the emitter of transistor 328 is therefore coupled through the thumb wheel switches 322 and 324 to oscillator 270. When, however, the pressure rises to such a point that the output of pressure sensor 218 exceeds that corresponding to the set point of potentiometer 366, the output of amplifier 360 switches to a positive polarity, transistors 322 and 324 are turned "off," and the input to oscillator 270 from switches 322 and 324 is cut off. The oscillator is thus effectively disabled, except for a residual driving current supplied to it from potentiometer 350.

When the output of pressure sensor 218 exceeds that obtained from potentiometer 366, the output of amplifier 360 goes positive, diode 370 conducts and feeds a portion of the output back to the input. This rapidly drives the amplifier to saturation and holds it in the saturated state such that it is thereafter insensitive to any changes in the input. The positive output of amplifier 360 turns off transistor 326 and thus transistor 328. Further, it turns on a transistor 380 and lights a warning light 382 to indicate that preset pressure limits have been exceeded. The amplifier 360 is reset by means of pushbutton switch 372. Momentarily depressing this switch disconnects the positive feedback around the amplifier and allows it to return to its usual monitoring state.

As noted earlier, the period of oscillator 270 can be changed by changing its input or by changing the control voltage applied to the gate of unijunction transistor 314. As the pressure in the line to which motor 210 is connected increases, the output of pressure sensor 218 becomes increasingly negative. This output is coupled through potentiometer 318 to the gate of transistor 314 and thus the control potential on this gate is lowered as the pressure increases. This increases the repetition frequency of the oscillator 270 and thus speeds up the motor 210. Accordingly, as the pressure in the line increases due to compressability of the fluid or compressabililty of the line, the motor driving rate is speeded up in order to maintain a constant volume flow rate. This is desirable in applications such as chromatography.

Figure 4:
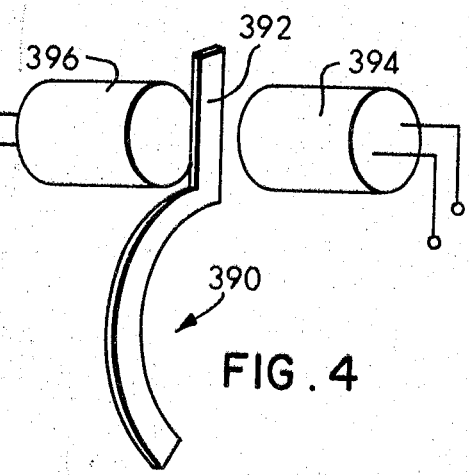
FIG. 4 is a sketch of a pressure guage used in the present invention.

The pressure sensor 218 of the present invention is especially simple in design and operation. Referring briefly to FIG. 4, the sensor is formed from a mechanical pressure sensor such as Bourdon tube 390 having a mechanically movable indicator element 392 which moves between a light source 392 and a light responsive transducer such as a photocell 396. The tube 390 is connected into the fluid line whose pressure is being measured, as the tube expands or contracts, it moves the indicator 392 to block a greater or lesser amount of light from the photocell 396 and the resistance of this cell thus varies in accordance with line pressure.

Referring back to FIG. 2, the photocell 396 is connected in a bridge circuit with resistors 396, 398, 400 and 402. The bridge output, which is proportional to the resistance of photocell 396 and thus to the position of indicator 392 in response to the fluid line pressure, is applied to an amplifier 404 which provides an output proportional to the deviation of this pressure from a convenient "zero point" determined by the magnitude of resistors 398-402. For the configuration shown, this output preferably ranges between 0 volts and some negative voltage level. This voltage determines the motor driving rate and motor drive current as previously described.

Figure 5:
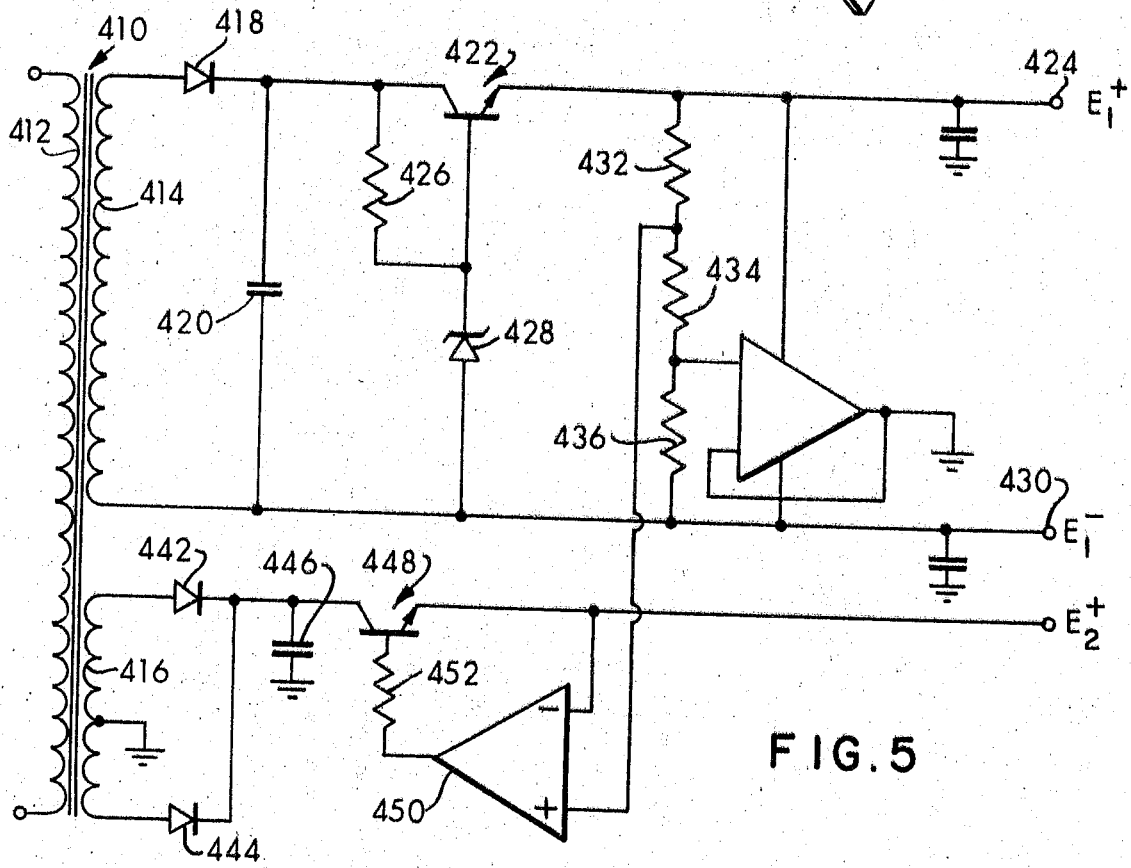
FIG. 5 is a power supply in accordance with the present invention.

Turning now to FIG. 5, an especially advantageous power supply for supplying the necessary voltages for the active elements in the control circuit is shown. In FIG. 5, a transformer 410 has a primary winding 412 and a pair of secondary windings 414 and 416. The winding 414 has a diode 418 in series with it and a capacitor 420 connected across it. A series pass regulator in the form of a transistor 422 controls the voltage drop between the cathode of diode 418 and a first output terminal 424. A resistor 426 is connected from collector to base of transistor 422 and a zener diode 428 is connected between base and a second output terminal 430. Voltage divider resistors 432, 434 and 436 are connected across terminals 424 and 430.

An amplifier 440 has one input terminal connected between the junction of resistor 434 and 436 and a second input terminal connected to its output terminal and thence to ground. The amplifier 440 is chosen to have sufficiently high gain (of the order of tens of thousands of more) such that the junction of resistors 434 and 436 is effectively at ground potential. In this case, terminal 424 is thus at a potential above ground, while terminal 430 is at a potential below ground. The power inputs for amplifier 226 are taken from the terminals 424 and 426.

The amplifier 440 effectively provides a low impedence return path to ground for currents drawn from terminals 424 or 430. If the junction of resistors 434 and 436 were directly grounded without the use of such an amplifier, the return path to ground would include the resistors 432 and 434 in case of current drawn from terminal 424, and would include resistor 436 in the case of current drawn from terminal 430. The currents through these resistors would vary with the load demands and thus the output voltage would vary accordingly. Through the use of amplifier 440, however, this effect is mitigated and the voltage regulation of the power supply is thus greatly improved.

An auxiliary power supply is formed from transformer secondary winding 416, which is center-tapped, in connection with diodes 442 and 444 which provide full wave rectification for the voltage applied across transformer 416. A filter and regulator is formed from capacitor 446, series pass regulator transistor 448, and amplifier 450 and resistor 452. The auxiliary supply receives a reference voltage from the common connection point of resistors 432 and 434 in the primary power supply. The auxiliary power supply is otherwise conventional and will not be described in further detail.

From the foregoing, it will be seen that I have provided an improved motor control circuit. The circuit limits power dissipation in a stepping motor by limiting the motor drive current to that demanded by the load, so that heat dissipation in the motor is kept to a minimum. In connection with the control circuit, I have provided a useful driving circuit for operating a silicon-controlled rectifier in a phase-controlled power supply network and additionally have provided a very simply yet effective variable frequency oscillator for use in conjunction with a motor drive circuit.

Further, I have provided an inexpensive and useful power supply for supplying the active elements in a control circuit.

Finally, I have inexpensively yet effectively obviated undesired oscillations or resonances in connection with driving a stepping motor.

It will be understood from the foregoing that various changes may be made in the circuits described herein without departing from the spirit or the scope of the invention and it is intended that the foregoing material be taken as illustrative only and not in a limiting sense, the scope of the invention being defined by the claims.

Having described my invention, I claim:

1. A motor control circuit whereby a bifilar stepping motor is adapted for operation through a large speed range without resonance, comprising
   A. means for monitoring a load which is driven by said bifilar stepping motor;
   B. means for continuously supplying drivin current to said motor; and
   C. control means responsive to said monitoring means for limiting the continuous driving current in accordance with the load being monitored;
   and wherein said circuit also comprises
   A. means for sensing the current supplied to said motor;
   B. means associated with said monitoring means for providing an output current proportional to the load being monitored; anad
   C. current summing means providing an output dependent on the difference between the motor current and the monitor current for controlling the driving current supply means.

2. A motor control circuit according to claim 1 in which the current summing means includes an integrator whereby the driving current supply means responds to the difference between the motor current and the monitor current over a time interval corresponding to the integration time of the integrator.

3. A motor control circuit according to claim 2 which includes means for discharging the integrator from time to time.

4. A motor control circuit according to claim 1 in which the control means includes:
   A. an integrator having applied as inputs thereto a first current proportional to the current through the motor and a second current of opposite polarity to the first current and proportional to the output of the monitoring means;
   B. a capacitor connected to the output of the integrator; and
   C. a switch interposed between said capacitor and the driving current supply means.

5. A motor control circuit according to claim 4 in which said capacitor controls the firing point of a controlled rectifier in the driving current supply means whereby the current applied to the motor is dependent on the change on said capacitor.

6. A motor control circuit according to claim 1 in which the motor is a stepping motor having a plurality of control windings for driving said motor and having a plurality of switches associated with the control windings for distributing current to said windings in accordance with a predetermined schedule, and which includes a rate control circuit for energizing said switches at a controlled rate.

7. A motor control circuit according to claim 1 in which said motor is a stepping motor having a plurality of control windings and a switch in each winding for selectively energizing said windings and which includes auxiliary switching means in series with each winding and each switch to allow current to flow through said windings in a first direction only.

8. A motor control circuit according to claim 7 in which said auxiliary switching means comprises a diode.

9. A motor control circuit for continuously controlling a stepping motor while minimizing heat generation of said motor, said circuit comprising a stepping motor and
A. means for monitoring a load being driven by said stepping motor;
B. means for supplying driving current to said stepping motor; and
C. a pulse generator responsive to the load-monitoring means for supplying driving pulses to the motor to drive it at a rate dependent at least in part on the load driven by said motor;
and in which said pulse generator comprises
A. a multi-stable device providing at least one distinct output for each control winding in said motor; and
B. an oscillator having a selectively variable repetition rate for driving said device.

10. A motor control circuit according to claim 9 in which said motor is a stepping motor having a plurality of control windings and a switch in each winding for selectively energizing said windings and which includes auxiliary switching means in series with each winding and each switch to allow current to flow through said windings in a first direction only.

11. A motor control circuit according to claim 10 in which said auxiliary switching means comprises a diode.

12. A motor control circuit, whereby a bifilar stepping motor is adapted for operation through a large speed range, without resonance, comprising
A. means for monitoring a load which is driven by a bifilar stepping motor;
B. means for continuously supplying driving current to said motor; and
C. control means responsive to said monitoring means for limiting the continuous driving current in accordance with the load being monitored which circuit further includes:
D. means for sensing the current supplied to said motor;
E. means associated with said monitoring means for providing an output current proportional to the load being monitored; and
F. current summing means providing an output dependent on the difference between the motor current and the monitor current for controlling the driving current supply means and wherein the current summing means includes an integrator whereby the driving current supply means responds to the difference between the motor current and the monitor current over a time interval corresponding to the integration time of the integrator; and also means for discharging the integrator from time to time; and in which the driving current supply means includes a converter for converting an AC voltage to a DC voltage in which the discharge of said integrator is synchronized with the zero crossings of the AC voltage.

13. A motor circuit, whereby a bifilar stepping motor is adapted for operation through a large speed range without resonance comprising
A. means for monitoring a load which is driven by a bifilar stepping motor;
B. means for continuously supplying driving current to said motor; and
C. control means responsive to said monitoring means for limiting the continuous driving current in accordance with the load being monitored and in which the driving current supply means comprises:

A. a first rectifier for converting an AC voltage into a pulsating DC voltage;
B. a filter for filtering the pulsating DC voltage;
C. a controlled rectifier
1. in series with the output of the first rectifier,
2. having a control gate connected to said control means, and
3. responsive to said control means to control the duration which the controlled rectifier connects the output of the first rectifier to the filter circuit; and
D. means associated with the controlled rectifier for assisting in turning on said rectifier.

14. A motor control circuit, whereby a bifilar stepping motor is adapted for operation through a large speed range without resonance comprising
A. means for monitoring a load which is driven by a bifilar stepping motor;
B. means for continuously supplying driving current to said motor; and
C. control means responsive to said monitoring means for limiting the continuous driving current in accordance with the load being monitored; and in which the control means includes:
A. an integrator having applied as inputs thereto a first current proportional to the current through the motor and a second current of opposite polarity to the first current and proportional to the output of the monitoring means;
B. a capacitor connected to the output of the integrator and
C. a switch interposed between said capacitor and the driving current supply means; and
in which said capacitor controls the firing point of a controlled rectifier in the driving current supply means whereby the current applied to the motor is dependent on the charge on said capacitor; and wherein said motor control circuit includes means for discharging said capacitor from time to time in accordance with an AC voltage applied to the driving current supply means.

15. A motor control circuit according to claim 14 in which the means for assisting the turn-on of the controlled rectifier includes a capacitor connected between the output of the controlled rectifier and a terminal common to the first rectifier, said capacitor initially presenting a low impedance to the output of the controlled rectifier whereby turn on is assisted.

16. A motor control circuit according to claim 14 in which the means associated with the controlled rectifier includes a resistor connected between the output of said rectifier and terminal commo to the first rectifier for maintaining a small current through the resistor and through the controlled rectifier to maintain said rectifier in the "on" condition when the output of the filter is at a higher potential than the input thereto.

17. A motor control circuit, whereby a bifilar stepping motor is adapted for operation through a large speed range without resonance comprising
   A. means for monitoring a load which is driven by a bifilar stepping motor;
   B. means for continuously supplying driving current to said motor; and
   C. control means responsive to said monitoring means for limiting the continuous driving current in accordance with the load being monitored; and in which the motor is bifilar stepping motor having a plurality of control windings for driving said motor and having a plurality of switches associated with the control windings for distributing current to said windings in accordance with a predetermined schedule, and which includes a rate control circuit for energizing said switches at a controlled rate and wherein said rate control circuit includes an oscillator comprising:
   A. an integrator having an input and an output;
   B. means connecting the output to the motor winding control switches for driving said motor; and
   C. switching means having a control gate for discharging the integrator when the integrator output reaches a magnitude determined by the potential applied to said control gate.

18. A motor control circuit according to claim 17 in which the control gate is connected to the load monitoring means whereby the repetition rate of said oscillator is dependent on the load.

19. A motor control circuit according to claim 17 which includes means for connecting thte integrator input to a potential source of selectable magnitude whereby the integration time of said integrator may be controlled.

20. A motor control circuit for controlling a bifilar stepping motor, whereby a bifilar stepping motor is adapted for operation through a large speed range without resonance comprising
   A. means for continuously monitoring a load being driven by said motor;
   B. means for continuously supplying driving current to said motor; and
   C. a pulse generator responsive to the monitoring means for supplying driving pulses to the motor to drive it at a rate dependent at least in part on the load driven by said motor; and
in which said pulse generator comprises:
   A. a multi-stable device providing at least one distinct output for each control winding in said motor; and
   B. an oscillator having a selectively variable repetition rate for driving said device; and
in qhich said oscillator comprises an amplifier, a capacitor connected between the input and output of said amplifier and forming an integrator with said amplifier, and means for discharging said capacitor from time to time to control the integration time of said integrator.

21. A control circuit according to claim 20 in which the discharge means has a control terminal to which a control potential is applied to discharge said capacitor when the integrator output bears a predetermined relation to the control input.

22. A control circuit according to claim 21 in which the control input is connected to the said load monitoring means whereby the repetition rate of said oscillator is dependent on the load being driven.

* * * * *

UNITED STATES PATENT OFFICE
CERTIFICATE OF CORRECTION

Patent No. 3,855,515      Dated December 17, 1974

Inventor(s) Burleigh M. Hutchins, Jr.

It is certified that error appears in the above-identified patent and that said Letters Patent are hereby corrected as shown below:

Column 7, line 10: delete "320"

Column 7, line 12: delete "320"

Column 7, line 27: delete "320"

Column 7, line 31: delete "320"

Column 7, line 13: change "322" to --337--

Column 7, line 21: "320" to --322--

Signed and Sealed this

Thirty-first Day of May 1977

[SEAL]

Attest:

RUTH C. MASON
*Attesting Officer*

C. MARSHALL DANN
*Commissioner of Patents and Trademarks*